US012361831B2

(12) United States Patent
Lei

(10) Patent No.: US 12,361,831 B2
(45) Date of Patent: Jul. 15, 2025

(54) PLATOONING PROCESSING METHOD AND APPARATUS, COMPUTER-READABLE MEDIUM, AND ELECTRONIC DEVICE

(71) Applicant: Tencent Technology (Shenzhen) Company Limited, Shenzhen (CN)

(72) Inventor: Yixue Lei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 207 days.

(21) Appl. No.: 17/991,772

(22) Filed: Nov. 21, 2022

(65) Prior Publication Data
US 2023/0080076 A1    Mar. 16, 2023

Related U.S. Application Data

(63) Continuation of application No. PCT/CN2021/137693, filed on Dec. 14, 2021.

(30) Foreign Application Priority Data
May 17, 2021 (CN) .......................... 202110535375.8

(51) Int. Cl.
*G08G 1/00* (2006.01)
*B60W 30/165* (2020.01)
(Continued)

(52) U.S. Cl.
CPC ........... *G08G 1/207* (2013.01); *B60W 30/165* (2013.01); *B60W 40/02* (2013.01); *G05D 1/0293* (2013.01);
(Continued)

(58) Field of Classification Search
CPC ....... G08G 1/207; G08G 1/22; B60W 30/165; B60W 40/02; B60W 2555/20;
(Continued)

(56) References Cited

U.S. PATENT DOCUMENTS 9,632,507 B1 *   4/2017   Korn ..................... G08G 1/22
9,940,840 B1 *   4/2018   Schubert ............... G06Q 30/06
(Continued)

FOREIGN PATENT DOCUMENTS

CN           102906654 A           1/2013
CN           105702018 A   *       6/2016   ............... G08G 1/22
(Continued)

OTHER PUBLICATIONS

Tencent Technology, WO, PCT/CN2021/137693, Mar. 9, 2022, 5 pgs.
(Continued)

*Primary Examiner* — Peter D Nolan
*Assistant Examiner* — Peter Y Ning
(74) *Attorney, Agent, or Firm* — Morgan, Lewis & Bockius LLP

(57) ABSTRACT

An electronic device obtains location information and traveling status information of multiple vehicles in platooning, and traffic condition information of a road segment on which the multiple vehicles travel. The electronic device determines whether the multiple vehicles are suitable for continuing the platooning according to the location information and the traveling status information of the multiple vehicles, and the traffic condition information of the road segment on which the multiple vehicles travel. The electronic device transmits a platoon dismissing notification message to the multiple vehicles when it is determined that the multiple vehicles are not suitable for continuing the platooning, to inform the multiple vehicles to cancel the platooning.

20 Claims, 5 Drawing Sheets

(51) Int. Cl.
*B60W 40/02* (2006.01)
*G05D 1/00* (2006.01)

(52) U.S. Cl.
CPC ..... *B60W 2555/20* (2020.02); *B60W 2556/65* (2020.02)

(58) Field of Classification Search
CPC B60W 2556/65; B60W 30/08; G05D 1/0293; G05D 1/0297
See application file for complete search history.

(56) References Cited

U.S. PATENT DOCUMENTS

| | | | |
|---|---|---|---|
| 2013/0211624 A1* | 8/2013 | Lind | G05D 1/0293 701/2 |
| 2019/0035284 A1* | 1/2019 | Tam | H04W 4/46 |
| 2019/0079540 A1* | 3/2019 | Yoon | G05D 1/0295 |
| 2019/0129440 A1* | 5/2019 | Borhan | G05D 1/0223 |
| 2019/0179338 A1 | 6/2019 | Kim | |
| 2019/0286163 A1* | 9/2019 | Yasuda | B60W 30/16 |
| 2019/0383638 A1* | 12/2019 | Cho | G05D 1/0295 |
| 2020/0013292 A1* | 1/2020 | Switkes | B60W 30/165 |
| 2020/0082727 A1* | 3/2020 | Zhao | G08G 1/0116 |
| 2020/0125086 A1 | 4/2020 | Switkes et al. | |
| 2020/0193838 A1* | 6/2020 | Yoo | G08G 1/0112 |
| 2021/0041893 A1* | 2/2021 | Matsumoto | G05D 1/0293 |
| 2021/0256854 A1* | 8/2021 | Alieiev | G08G 1/0112 |
| 2022/0058956 A1* | 2/2022 | Ogata | G08G 1/0116 |
| 2022/0319337 A1* | 10/2022 | Plascencia-Vega | G08G 1/096811 |
| 2023/0123121 A1* | 4/2023 | Park | G05D 1/0293 701/23 |

FOREIGN PATENT DOCUMENTS

| | | | | |
|---|---|---|---|---|
| CN | 106919173 A | | 7/2017 | |
| CN | 107209984 A | | 9/2017 | |
| CN | 108877199 A | | 11/2018 | |
| CN | 111290400 A | | 6/2020 | |
| CN | 111768612 A | | 10/2020 | |
| CN | 112233424 A | * | 1/2021 | |
| CN | 112312485 A | * | 2/2021 | ........... H04W 28/26 |
| CN | 112596522 A | | 4/2021 | |
| CN | 112634606 A | * | 4/2021 | |
| CN | 113119961 A | * | 7/2021 | ........... B60W 30/08 |
| DE | 102019112662 A1 | | 11/2020 | |
| KR | 20210011660 A | | 2/2021 | |
| WO | WO-2016128787 A1 | * | 8/2016 | ............... G08G 1/22 |
| WO | WO-2022187046 A1 | * | 9/2022 | .......... B60W 30/165 |

OTHER PUBLICATIONS

Tencent Technology, IPRP, PCT/CN2021/137693, Nov. 21, 2023, 6 pgs.
Tencent Technology, ISR, PCT/CN2021/137693, Mar. 9, 2022, 3 pgs.

* cited by examiner

PLATOONING PROCESSING METHOD AND APPARATUS, COMPUTER-READABLE MEDIUM, AND ELECTRONIC DEVICE

CROSS-REFERENCE TO RELATED APPLICATIONS

This application is a continuation application of PCT Patent Application No. PCT/CN2021/137693, entitled "FORMATION TRAVEL PROCESSING METHODS, DEVICES, COMPUTER-READABLE MEDIA AND ELECTRONIC EQUIPMENT" filed on Dec. 14, 2021, which claims priority to Chinese Patent Application No. 202110535375.8, filed with the State Intellectual Property Office of the People's Republic of China on May 17, 2021, and entitled "PLATOONING PROCESSING METHOD AND APPARATUS, COMPUTER-READABLE MEDIUM, AND ELECTRONIC DEVICE", all of which are incorporated herein by reference in their entirety.

FIELD OF THE TECHNOLOGY

This application relates to the field of computer and communication technologies, and specifically, to a platooning processing method and apparatus, a computer-readable medium, and an electronic device.

BACKGROUND OF THE DISCLOSURE

Advanced driving assistance system (ADAS) uses various sensors (such as a millimeter-wave radar sensor, a LIDAR sensor, a monocular or binocular camera, a navigation satellite, and the like) installed on a vehicle to sense the surrounding environment in real time, collect data, identify static and dynamic objects, perform detection and tracking during traveling of the vehicle, and perform systematic calculation and analysis, in combination with navigation map data, so that the driver can be aware of the possible danger in advance, which effectively increases the comfort and safety of automobile driving.

However, the traditional ADAS has a problem of a limited perception range. When there is a driving safety risk, a more effective coordination mechanism is lacked among multiple vehicles. As a result, there are limitations in safety, especially when the ADAS is applied to platooning.

SUMMARY

Embodiments of this application provide a platooning processing method and apparatus, a computer-readable medium, and an electronic device, to enhance the platooning safety at least to some extent.

Other features and advantages of this application become obvious through the following detailed descriptions, or may be partially learned partially through the practice of this application.

According to an aspect of the embodiments of this application, a platooning processing method is provided, performed by an electronic device. The method includes: obtaining location information and traveling status information of multiple vehicles in platooning, and traffic condition information of a road segment on which the multiple vehicles travel; determining whether the multiple vehicles are suitable for continuing the platooning according to the location information and the traveling status information of the multiple vehicles, and the traffic condition information of the road segment on which the multiple vehicles travel; and transmitting a platoon dismissing notification message to the multiple vehicles in accordance with a determination that the multiple vehicles are not suitable for continuing the platooning, to inform the multiple vehicles to cancel the platooning.

According to an aspect of the embodiments of this application, a platooning processing apparatus is provided. The apparatus includes: an obtaining unit, configured to obtain location information and traveling status information of multiple vehicles in platooning, and traffic condition information of a road segment on which the multiple vehicles travel; a processing unit, configured to determine whether the multiple vehicles are suitable for continuing the platooning according to the location information and the traveling status information of the multiple vehicles, and the traffic condition information of the road segment on which the multiple vehicles travel; and a transmission unit, configured to transmit a platoon dismissing notification message to the multiple vehicles when it is determined that the multiple vehicles are not suitable for continuing the platooning, to inform the multiple vehicles to cancel the platooning.

According to an aspect of the embodiments of this application, a non-transitory computer-readable medium is provided, storing a computer program, the computer program, when executed by a processor, implementing the platooning processing method according to the foregoing embodiments.

According to an aspect of the embodiments of this application, an electronic device is provided. The electronic device includes: one or more processors; and a storage apparatus, configured to store one or more programs. The one or more programs, when executed by the one or more processors, causing the one or more processors to implement the platooning processing method according to the foregoing embodiments.

According to an aspect of the embodiments of this application, a computer program product or a computer program is provided. The computer program product or the computer program includes computer instructions, the computer instructions being stored in a non-transitory computer-readable storage medium. A processor of a computer device reads the computer instructions from the computer-readable storage medium, and executes the computer instructions, so that the computer device performs the platooning processing method according to the foregoing embodiments.

It is to be understood that the foregoing general descriptions and the following detailed descriptions are merely for illustration and explanation purposes and are not intended to limit this application.

BRIEF DESCRIPTION OF THE DRAWINGS

The accompanying drawings herein, which are incorporated into the specification and constitute a part of this specification, show embodiments that conform to this application, and are used for describing a principle of this application together with this specification. Apparently, the accompanying drawings in the following description show merely some embodiments of this application, and a person of ordinary skill in the art may still derive other drawings from these accompanying drawings without creative efforts. In the accompanying drawings.

DESCRIPTION OF EMBODIMENTS

Exemplary implementations are now described more comprehensively with reference to the accompanying drawings. However, the exemplary implementations may be implemented in various forms, and are not to be understood as being limited to the examples described herein. Instead, the implementations are provided to make this application more thorough and complete and fully convey the idea of the exemplary implementations to a person skilled in the art.

In addition, the described features, structures, or characteristics may be combined in one or more embodiments in any appropriate manner. In the following descriptions, more specific details are provided to provide a comprehensive understanding of the embodiments of this application. However, a person skilled in the art is to be aware that, the technical solutions in this application may be implemented without one or more of the specific details, or another method, unit, apparatus, or step may be used. In other cases, well-known methods, apparatuses, implementations, or operations are not shown or described in detail, to avoid obscuring aspects of this application.

The block diagrams shown in the accompany drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change according to an actual case.

"Multiple" mentioned herein means two or more. "And/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
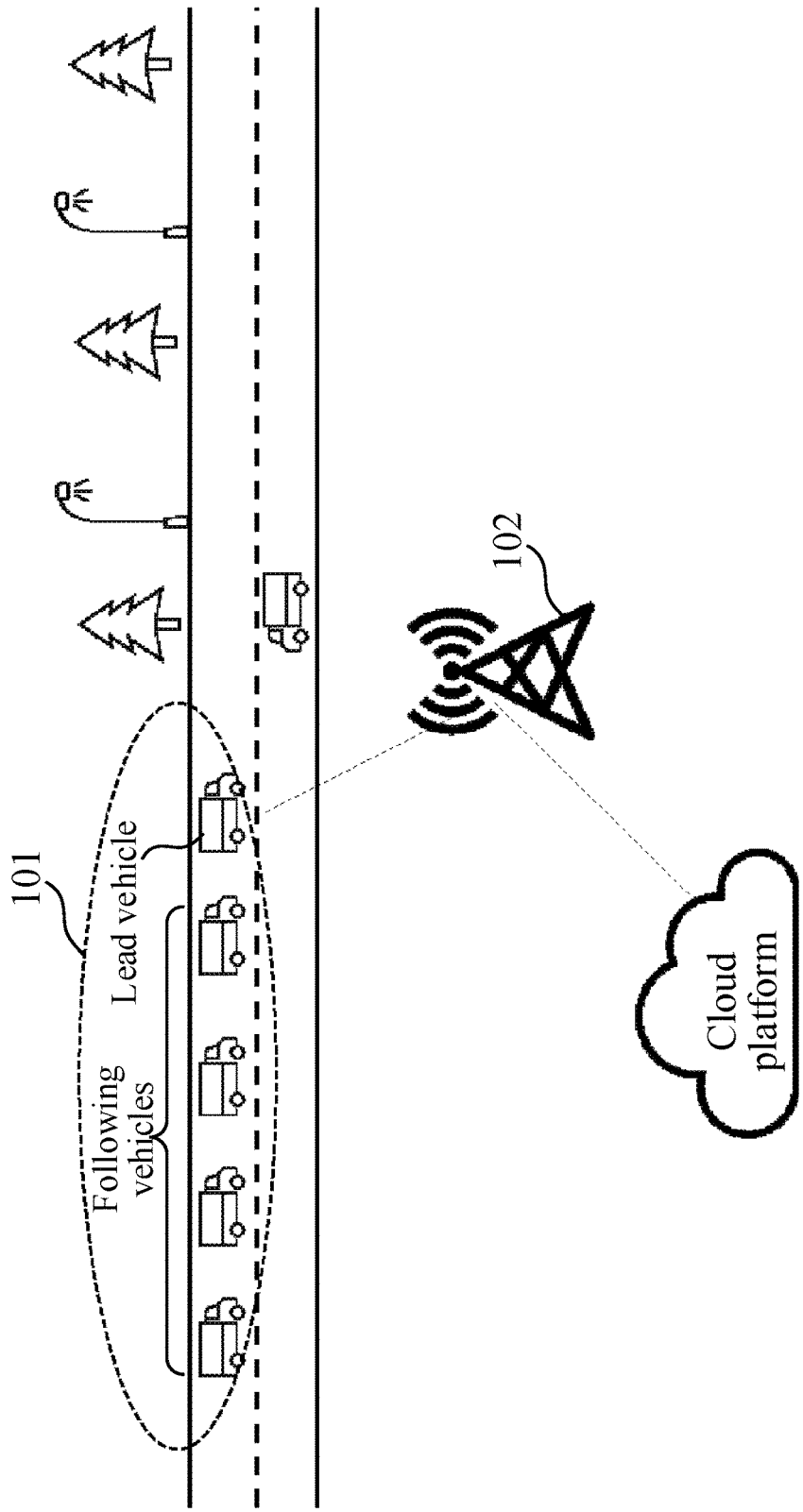
FIG. 1 is a schematic diagram of an application scenario according to an embodiment of this application.

FIG. 1 is a schematic diagram of an application scenario according to an embodiment of this application.

As shown in FIG. 1, in an application scenario of this application, a vehicle may communicate with a cloud platform through a base station 102, and the cloud platform may implement high-precision positioning on the vehicle by communicating with a high-precision positioning system and cooperating with the vehicle. The base station 102 may be a 5G base station, a 3G base station, or a 4G base station, or may be a next generation mobile communication base station. The cloud platform may be a roadside cloud platform or a central cloud platform. The roadside cloud platform is a cloud platform that is arranged near the road and only serves a small number of road segment. Compared with the roadside cloud platform, the central cloud platform is a cloud platform that serves multiple road segment or a whole road segment, and has a service range much larger than that of the roadside cloud platform, and the central cloud platform may be arranged at a rear end of a core network.

In addition to interacting with the cloud platform (including the central cloud platform and the roadside cloud platform) through the base station 102 (that is, the mobile communication network) as shown in FIG. 1, the vehicle can also interact with the roadside cloud platform through vehicle to everything (V2X) communication.

In an embodiment of this application, the vehicle shown in FIG. 1 may equipped with an ADAS function, and the ADAS function specifically includes a warning system and a control system. The warning system includes forward collision warning (FCW), lane departure warning (LDW), blind spot detection (BSD), driver fatigue warning (DFW), tire pressure monitoring system (TPMS), and the like. The control system includes lane keeping assist (LKA), automated parking system (APS), automatic emergency braking (AEB), adaptive cruise control (ACC), pedestrian protection system (PPS), down-hill assist control (DAC), and the like. Certainly, in the embodiments of this application, not all vehicles have the ADAS function, and the vehicle with the ADAS function does not have all the functions described above, and may only have some ADAS functions.

Referring to FIG. 1, in a vehicle platoon 101, the following vehicles and the lead vehicle perform platooning together. For example, FIG. 1 shows that lead vehicle and the following vehicles are traveling in the same lane, with the following vehicles trailing the lead vehicle (e.g., at close proximity). The cloud platform may obtain location information and traveling status information of multiple vehicles in the vehicle platoon 101, and traffic condition information of a road segment on which the multiple vehicles travel, then determine whether the multiple vehicles are suitable for continuing the platooning according to the location information and the traveling status information of the multiple vehicles, and/or the traffic condition information of the road segment on which the multiple vehicles travel. The cloud platform can transmit a platoon dismissing notification message to the multiple vehicles in accordance with a determination that the multiple vehicles are not suitable for continuing the platooning, to inform the multiple vehicles, to cancel the platooning (e.g., thereby causing the following vehicles to drive in a different lane, or reduce their speeds, or increase the distance between vehicles, etc.). It may be learned that, the technical solutions in the embodiments of this application enable the cloud platform to synthesize multiple pieces of information to determine whether the vehicles are suitable for continuing the platooning, thereby effectively enhancing the safety of the platooning.

In an embodiment of this application, the cloud platform may determine whether the vehicles are suitable for continuing the platooning by means of artificial intelligence (AI) technology. AI technology is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science and attempts to understand the essence of intelligence and produce a new intelligent machine that can react in a manner similar to human intelligence. AI is to study design principles and implementation methods of various intelligent machines, so that the machines have the functions of perception, reasoning, and decision-making.

At the same time, AI technology is a comprehensive discipline, covering a wide range of fields including both a hardware-level technology and a software-level technology. Basic AI technologies generally include technologies such as sensors, dedicated AI chips, cloud computing, distributed storage, big data processing technologies, operating/interaction systems, and mechatronics. AI software technologies mainly include fields such as a computer vision technology, a speech processing technology, a natural language processing technology, machine learning/deep learning, and the like.

Computer vision (CV) is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, the CV studies related theories and technologies in an attempt to create an artificial intelligence system capable of obtaining information from images or multidimensional data. The CV technologies usually comprise technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, or map construction, and further comprise biological feature recognition technologies such as common face recognition and fingerprint recognition.

In terms of this application, both the vehicles and the cloud platform can adopt technologies computer vision such as machine learning in AI technology to improve the accuracy of the ADAS, and the vehicles can implement automatic driving based on this.

Implementation details of the technical solutions of the embodiments of this application are described below in detail.

Figure 2:
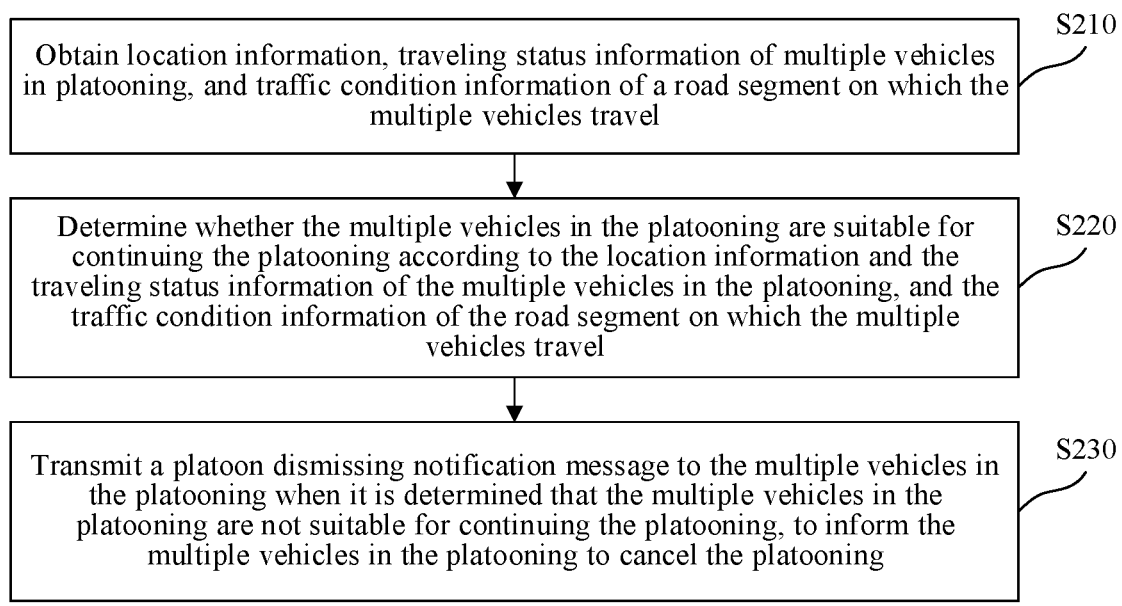
FIG. 2 is a flowchart of a platooning processing method according to an embodiment of this application.

FIG. 2 is a flowchart of a platooning processing method according to an embodiment of this application. The platooning processing method may be performed by a vehicle or a platooning processing apparatus shown in FIG. 5, or an electronic device shown in FIG. 6. Referring to FIG. 2, the platooning processing method includes at least steps S210 to S230, which are described below in detail:

Step S210. Obtain location information and traveling status information of multiple vehicles in platooning, and traffic condition information of a road segment on which the multiple vehicles travel.

In an embodiment of this application, when the cloud platform is a central cloud platform, the vehicles can transmit the location information, the traveling status information, and the traffic condition information of the road segment on which the vehicles travel to the central cloud platform through the mobile communication network. When the cloud platform is a roadside cloud platform, the vehicles can transmit the location information, the traveling status information, and the traffic condition information of the road segment on which the vehicles travel to the roadside cloud platform through the mobile communication network or Internet-of-Vehicles communication.

The location information of the vehicles may be transmitted by the vehicles to the cloud platform, or obtained by the cloud platform by implementing high-precision positioning on the vehicles by communicating with a high-precision positioning system and cooperating with the vehicles. The traveling status information of the vehicles includes speed information and acceleration information of the vehicles. The traffic condition information of the road segment on which the vehicles travel includes a potential safety risk of the road segment on which the multiple vehicles travel (for example, whether there is a landslide, whether there is a wet road, whether there is a crosswind, or whether there is a tunnel), or includes a vehicle condition in the road segment (for example, whether there is a potential safety risk of another vehicle).

Step S220. Determine whether the multiple vehicles in the platooning are suitable for continuing the platooning according to the location information and the traveling status information of the multiple vehicles in the platooning, and the traffic condition information of the road segment on which the multiple vehicles travel.

In an embodiment of this application, it is determined that the multiple vehicles are not suitable for continuing the platooning when it is determined according to the location information and the traveling status information of the multiple vehicles, and the traffic condition information that the road segment on which the multiple vehicles travel has a potential safety risk. The potential safety risk includes at least one of the following cases: there is a landslide on the road segment on which the multiple vehicles in the platooning, there is a wet road on the road segment on which the multiple vehicles in the platooning, there is a crosswind on the road segment on which the multiple vehicles in the platooning, and there is a tunnel on the road segment on which the multiple vehicles in the platooning.

In an embodiment of this application, it is determined that the multiple vehicles in the platooning are not suitable for continuing the platooning when it is determined according to the location information and the traveling status information of the multiple vehicles in the platooning, and the traffic condition information that a distance between the multiple vehicles needs to be increased and there are vehicles out of an effective communication range after the distance between the multiple vehicles is increased. In this embodiment, for example, it can be determined that the multiple vehicles are not suitable for continuing the platooning when a distance between the multiple vehicles needs to be increased when there is a wet road, and there are vehicles out of an effective communication range after the distance between the multiple vehicles is increased. The cloud platform may obtain ADAS capability information of the multiple vehicles in the platooning, and then determine the effective communication range between the multiple vehicles according to the communication capability information of the vehicles included in the ADAS capability information.

In an embodiment of this application, it is determined that the multiple vehicles are not suitable for continuing the platooning when it is determined according to the location information and the traveling status information of the multiple vehicles in the platooning, and the traffic condition information that there is interference from other objects on the road segment on which the multiple vehicles in the platooning. It is determined that there is interference from other objects on the road segment on which the multiple vehicles travel when it is determined according to the location information and the traveling status information of the multiple vehicles in the platooning, and the traffic condition information that some of the multiple vehicles can avoid the other objects and other vehicles while some other vehicles cannot avoid the other objects. For example, when there is another vehicle near the multiple vehicles in the platooning, and only some vehicles (such as the lead vehicle) can avoid the vehicle, while the other vehicles cannot avoid the vehicle, it can be determined that the multiple vehicles are not suitable for continuing the platooning.

In an embodiment of this application, it is determined that the multiple vehicles are not suitable for continuing the platooning when it is determined according to the location information and the traveling status information of the multiple vehicles in the platooning, and the traffic condition information that a network state of the road segment on which the multiple vehicles travel is insufficient to support the platooning. For example, it is determined that the network state of the road segment on which the multiple vehicles travel is insufficient to support the platooning when it is determined according to the location information and the traveling status information of the multiple vehicles in the platooning, and the traffic condition information that the road segment on which the multiple vehicles travel is not within a network coverage range or network quality of the road segment on which the multiple vehicles travel is less than a specified value. The network quality may be a network signal value, a network transmission rate value, or the like.

Step S230. Transmit a platoon dismissing notification message to the multiple vehicles in the platooning when it is determined that the multiple vehicles in the platooning are not suitable for continuing the platooning, to inform the multiple vehicles in the platooning to cancel the platooning.

In some embodiments of this application, based on the foregoing solutions, when an ADAS module is configured in the vehicles, the process of transmitting the platoon dismissing notification message to the multiple vehicles in the platooning may be that the cloud platform (the central cloud platform or the roadside cloud platform) transmits a notification message to the ADAS module of the multiple vehicles.

The cloud platform can transmit the platoon dismissing notification message to the lead vehicle of the multiple vehicles in the platooning, and then the lead vehicle transmits the platoon dismissing notification message to the other vehicles. Alternatively, in some embodiments, the cloud platform can transmit the platoon dismissing notification message to some vehicles in the platooning (the vehicles need to transmit the notification message to all vehicles in the platooning), and then the vehicles that receive the notification message transmit the notification message to the other vehicles. Alternatively, in some embodiments, the cloud platform can transmit the notification message to all vehicles in the platooning.

In an embodiment of this application, a notification message for maintaining the platooning can be transmitted to the multiple vehicles in the platooning when it is determined that the multiple vehicles in the platooning are suitable for continuing the platooning, to inform the multiple vehicles to maintain the platooning within a specified duration.

In an embodiment of this application, after transmitting the notification messages for maintaining the platooning to the multiple vehicles, the cloud platform can re-determine whether the multiple vehicles are suitable for continuing the platooning in accordance with receiving a request message of whether to maintain the platooning from a designated vehicle of the multiple vehicles in the platooning, and transmit the notification message for maintaining the platooning to the multiple vehicles when it is re-determined that the multiple vehicles in the platooning are suitable for continuing the platooning. The designated vehicle may be the lead vehicle of the multiple vehicles in the platooning, or may be any one of the multiple vehicles in the platooning. After receiving the notification message for maintaining the platooning transmitted by the cloud platform, the designated vehicle can start timing and transmit the request message of whether to maintain the platooning to the cloud platform after a timed duration reaches the specified duration.

In summary, according to the technical solutions of the embodiments of this application, the cloud platform (the central cloud platform or the roadside cloud platform) obtains the location information and the traveling status information of the multiple vehicles in the platooning, and the traffic condition information, analyzes whether the multiple vehicles are suitable for continuing the platooning, and transmits the platoon dismissing notification message to the multiple vehicles when it is determined that the multiple vehicles are not suitable for continuing the platooning, so that the cloud platform can synthesize multiple pieces of information (such as the location information and the traveling status information of the multiple vehicles, and the traffic condition information of the road segment on which the multiple vehicles travel) to determine whether the vehicles are suitable for continuing the platooning, thereby effectively enhancing the platooning safety. The detailed description is provided below with reference to FIG. 3.

Figure 3:
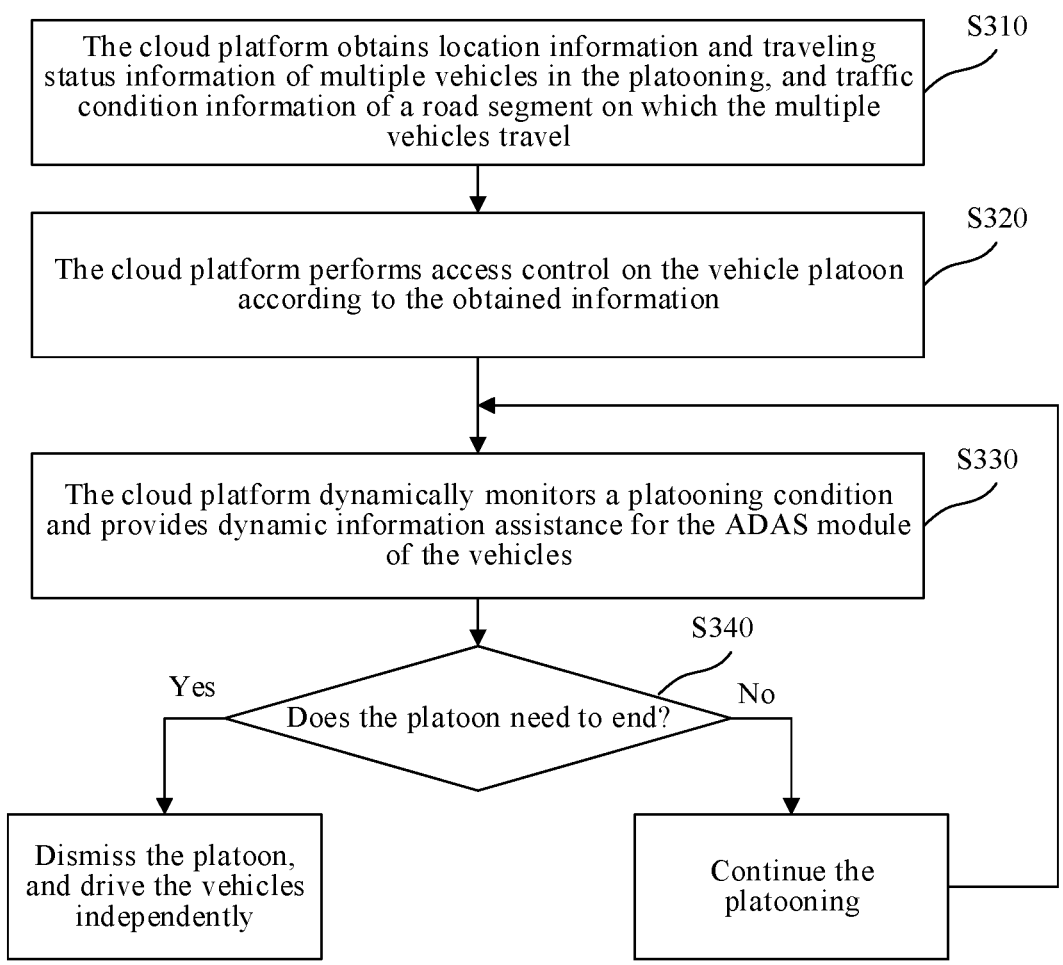
FIG. 3 is a flowchart of a platooning processing method according to an embodiment of this application.

FIG. 3 is a flowchart of a platooning processing method according to an embodiment of this application. Referring to FIG. 3, the platooning processing method includes steps S310 to S340, which are described below in detail:

Step S310. Obtain location information and traveling status information of vehicles in platooning, and traffic condition information of a road segment on which the multiple vehicles travel.

In an embodiment of this application, the cloud platform may be the central cloud platform or the roadside cloud platform. The central cloud platform provides large-scale coverage through the mobile communication network (such as a 5G network), and the roadside cloud platform provides small-scale coverage to a roadside unit (RSU) through a 5G base station or a vehicle to everything (V2X) network.

In an embodiment of this application, the traffic condition information may be a potential safety risk of the road segment on which the vehicles travel (for example, a landslide, a wet road, a crosswind, or a tunnel, etc.), or may be a vehicle condition in a specified road segment (for example, there is a potential safety risk of another vehicle, which leads to a situation that even if the lead vehicle can avoid, the following vehicles may fail to avoid). In this case, the cloud platform needs to inform the lead vehicle and the following vehicles to dismiss the vehicle platoon.

Step S320. The cloud platform performs access control on the vehicle platoon according to the obtained information.

In an embodiment of this application, because the traffic condition is strongly related to whether the platooning can be performed, and a management operator of the road segment needs to be responsible for traffic safety, whether the platooning can be performed on the specified road segment needs to be determined by the roadside cloud platform or the central cloud platform.

For example, a long steep road is wet due to snowfall and rainfall, and the distance between the vehicles needs to be increased, but the distance between the vehicles is excessive, which affects the control of the lead vehicle to the following vehicles (for example, out of the communication range). In this case, the platoon needs to be dismissed.

In this embodiment of this application, assuming that the cloud platform has obtained an identifier of the vehicle, the ADAS capability information, and a sensor function, a performance indicator and a communication capability of the vehicle itself. The communications capability includes Uu network connection, PC5 network connection, and the like. The cloud platform performs access control on the vehicle platoon, which may also be used as a value-added service provided by a road operator. The value-added service needs to rely on dynamic data of roads and other vehicles maintained by the road operator, and the beneficiary is the operator of the platooning, because the platooning can reduce manpower costs and save energy consumption.

Step S330. The cloud platform dynamically monitors a platooning condition and provides dynamic information assistance for the ADAS module of the vehicles.

Step S340. Determine whether the platoon needs to end. If yes, dismiss the platoon and drive the vehicles independently. If not, continue the platooning, and go back to step S330.

In an embodiment of this application, factors for the cloud platform to determine whether the platooning can be continued include information such as the traffic condition and the impact of other vehicles. Specifically, the traffic condition includes a potential safety risk of the specified road segment (for example, a landslide, a wet road, a crosswind, or a tunnel), other vehicle conditions include a vehicle conditions in the specified road segment (for example, there is a potential safety risk of another vehicle, which leads to a situation that even if the lead vehicle can avoid, the following vehicles may fail to avoid). In this case, the cloud platform needs to inform the lead vehicle and the following vehicles to dismiss the vehicle platoon.

In an embodiment of this application, the factors for the cloud platform to determine whether the platooning can be continued also include a network status. For example, for vehicles with a lower perception capability (especially the capability to follow vehicles as the following vehicles), that is, vehicles that need network assistance or even control, when the coverage of the 5G network is limited or the connection quality is low in a certain region, the platooning function may be canceled.

That the central cloud platform and the roadside cloud platform determine whether to continue the platooning can be indicated based on dynamic information or refreshed periodically.

Figure 4:
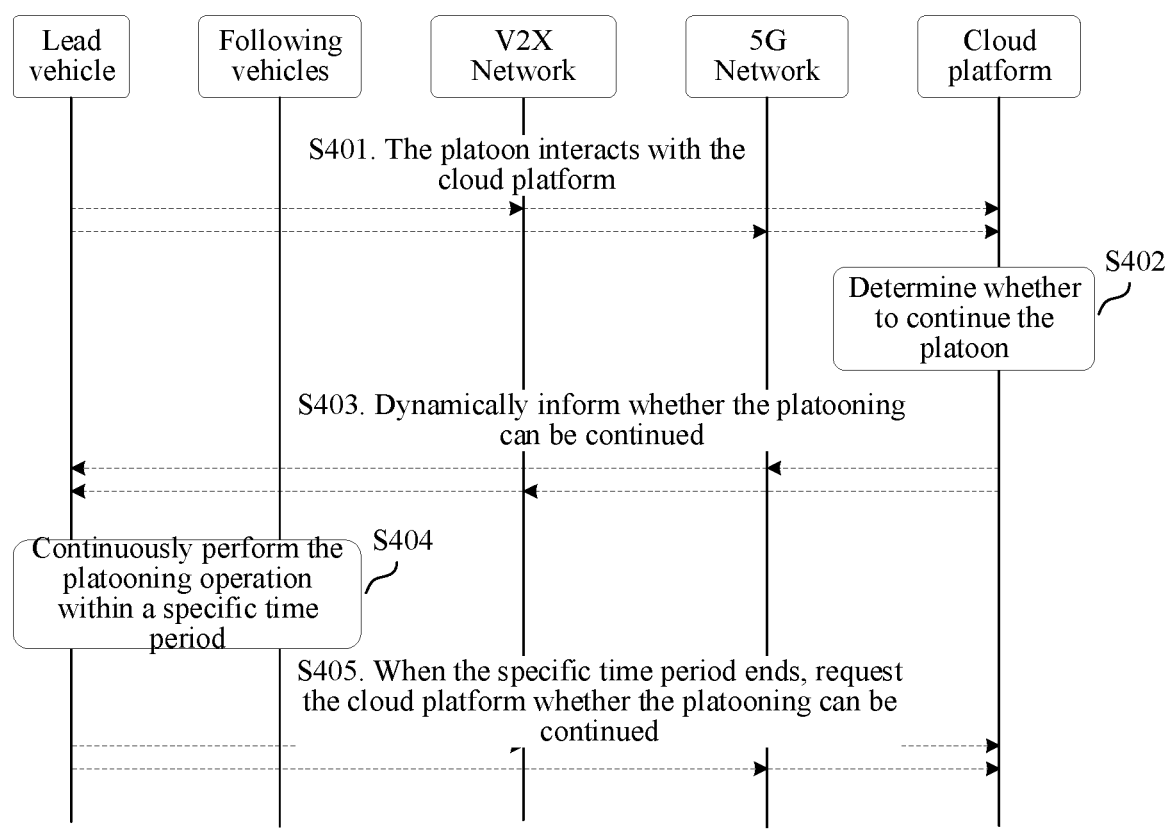
FIG. 4 is a flowchart of a platooning processing method according to an embodiment of this application.

FIG. 4 is a flowchart of a platooning processing method according to an embodiment of this application. Referring to FIG. 4, the platooning processing method includes steps S401 to S405, which are described below in detail:

Steps S401. Vehicles in platooning (may be the lead vehicle or other vehicles in the platooning) interact with the cloud platform (the roadside cloud platform or the central cloud platform).

Steps S402. The cloud platform determines whether to continue the platooning according to the determination method in the foregoing embodiments.

Step S403. The cloud platform dynamically informs the vehicle in the platooning (may be the lead vehicle or other vehicles in the platooning) whether the platooning can be continued.

Step S404. When the platooning can be continued, the vehicles continuously perform the platooning operation within a specific time period (e.g., time duration).

Steps S405. When the specific time period (e.g., time duration) ends, the vehicles in the platooning (may be the lead vehicle or other vehicles in the platooning) send a request to the cloud platform to continue the platooning. The cloud platform determines whether to continue the platooning according to the determination method in the foregoing embodiments and informs the vehicles of the result.

In an embodiment of this application, the cloud platform (the central cloud platform or the roadside cloud platform) can also provide ADAS assistance information to the vehicles during traveling to assist the vehicles in driving. Specifically, according to location information and traveling status information of a vehicle, and the traffic condition information, the cloud platform can analyze information such as locations and speeds of vehicles around to determine a safety risk of the vehicle, and transmit the information to vehicles within a specific range through the mobile communication network (such as the 5G network or a next-generation wireless communication system) or Internet of Vehicles. For example, when an emergency brake of a vehicle is detected, a serial rear-end collision warning can be transmitted to a vehicle located in a specific range behind the vehicle by means of 5G network technology, and the specific range includes the same lane and an adjacent lane.

The following describes an apparatus embodiment of this application, which can be used for performing the platooning processing method in the foregoing embodiments of this application. For details not disclosed in the apparatus embodiment of this application, reference may be made to the foregoing embodiments of the platooning processing method of this application.

Figure 5:
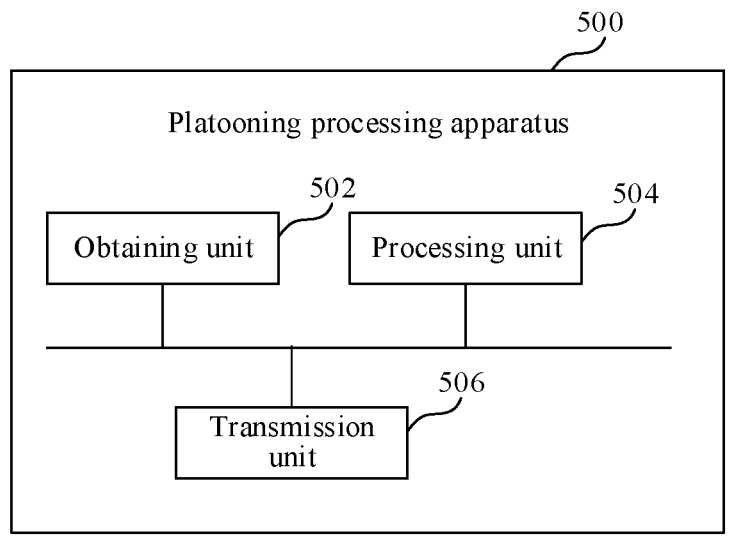
FIG. 5 is a block diagram of a platooning processing apparatus according to an embodiment of this application.

FIG. 5 is a block diagram of a platooning processing apparatus according to an embodiment of this application. The platooning processing apparatus may be arranged in a cloud platform, and the cloud platform may be a central cloud platform or a roadside cloud platform.

Referring to FIG. 5, a platooning processing apparatus 500 according to an embodiment of this application includes: an obtaining unit 502, a processing unit 504, and a transmission unit 506.

The obtaining unit 502 is configured to: obtain location information and traveling status information of multiple vehicles in platooning, and traffic condition information of a road segment on which the multiple vehicles travel. The processing unit 504 is configured to determine whether the multiple vehicles are suitable for continuing the platooning according to the location information and the traveling status information of the multiple vehicles, and the traffic condition information of the road segment on which the multiple vehicles travel. The transmission unit 506 is configured to transmit a platoon dismissing notification message to the multiple vehicles when it is determined that the multiple vehicles are not suitable for continuing the platooning, to inform the multiple vehicles to cancel the platooning.

In some embodiments of this application, based on the foregoing solutions, the processing unit 504 is configured to: determine that the multiple vehicles are not suitable for continuing the platooning when it is determined according to the location information and traveling status information of the multiple vehicles, and the traffic condition information that the road segment on which the multiple vehicles travel has a potential safety risk.

In some embodiments of this application, based on the foregoing solutions, the potential safety risk includes at least one of the following: there is a landslide on the road segment on which the multiple vehicles travel, there is a wet road on the road segment on which the multiple vehicles travel, there is a crosswind on the road segment on which the multiple vehicles travel, and there is a tunnel on the road segment on which the multiple vehicles travel.

In some embodiments of this application, based on the foregoing solutions, the processing unit 504 is configured to:

determine that the multiple vehicles are not suitable for continuing the platooning when it is determined according to the location information and the traveling status information of the multiple vehicles, and the traffic condition information that a distance between the multiple vehicles needs to be increased and there are vehicles out of an effective communication range after the distance between the multiple vehicles is increased.

In some embodiments of this application, based on the foregoing solutions, the processing unit 504 is further configured to: obtain advanced driving assistance system (ADAS) capability information of the multiple vehicles, where the ADAS capability information comprises communication capability information of the vehicles, and the communication capability information is used for determining the effective communication range between the multiple vehicles.

In some embodiments of this application, based on the foregoing solutions, the processing unit 504 is configured to: determine that the multiple vehicles are not suitable for continuing the platooning when it is determined according to the location information and the traveling status information of the multiple vehicles, and the traffic condition information that there is interference from other objects on the road segment on which the multiple vehicles travel.

In some embodiments of this application, based on the foregoing solutions, the processing unit 504 is further configured to: determine that there is interference from other objects on the road segment on which the multiple vehicles travel when it is determined according to the location information and the traveling status information of the multiple vehicles, and the traffic condition information that some of the multiple vehicles can avoid the other objects and other vehicles while some other vehicles cannot avoid the other objects.

In some embodiments of this application, based on the foregoing solutions, the processing unit 504 is configured to: determine that the multiple vehicles are not suitable for continuing the platooning when it is determined according to the location information and the traveling status information of the multiple vehicles, and the traffic condition information that a network state of the road segment on which the multiple vehicles travel is insufficient to support the platooning.

In some embodiments of this application, based on the foregoing solutions, the processing unit 504 is further configured to: determine that the network state of the road segment on which the multiple vehicles travel is insufficient to support the platooning when it is determined according to the location information and the traveling status information of the multiple vehicles, and the traffic condition information that the road segment on which the multiple vehicles travel is not within a network coverage range or network quality of the road segment on which the multiple vehicles travel is less than a specified value.

In some embodiments of this application, based on the foregoing solutions, the transmission unit 506 is further configured to: transmit a notification message for maintaining the platooning to the multiple vehicles when it is determined that the multiple vehicles are suitable for continuing the platooning, to inform the multiple vehicles to maintain the platooning within a specified duration.

In some embodiments of this application, based on the foregoing solutions, the processing unit 504 is further configured to: after the notification message for maintaining the platooning is transmitted to the multiple vehicles, re-determine whether the multiple vehicles are suitable for continuing the platooning when a request message of whether to maintain the platooning is received from a designated vehicle of the multiple vehicles, where the request message is transmitted by the designated vehicle after the specified duration; and transmit the notification message for maintaining the platooning to the multiple vehicles when it is re-determined that the multiple vehicles are suitable for continuing the platooning.

In some embodiments of this application, based on the foregoing solutions, the platooning processing apparatus 500 is arranged in the roadside cloud platform or the central cloud platform, and an ADAS module is configured in the multiple vehicles; and the transmission unit 506 is further configured to: transmit the notification message to the ADAS module of the multiple vehicles.

In the technical solutions provided in some embodiments of this application, whether the multiple vehicles are suitable for continuing the platooning is determined according to the location information and traveling status information of the multiple vehicles in the platooning, and the traffic condition information of the road segment on which the multiple vehicles travel, and the platoon dismissing notification message is transmitted to the multiple vehicles when it is determined that the multiple vehicles are not suitable for continuing the platooning, so that the cloud platform can synthesize multiple pieces of information (such as the location information and the traveling status information of the multiple vehicles, and the traffic condition information of the road segment on which the multiple vehicles travel) to determine whether the vehicles are suitable for continuing the platooning, thereby effectively enhancing the platooning safety.

Figure 6:
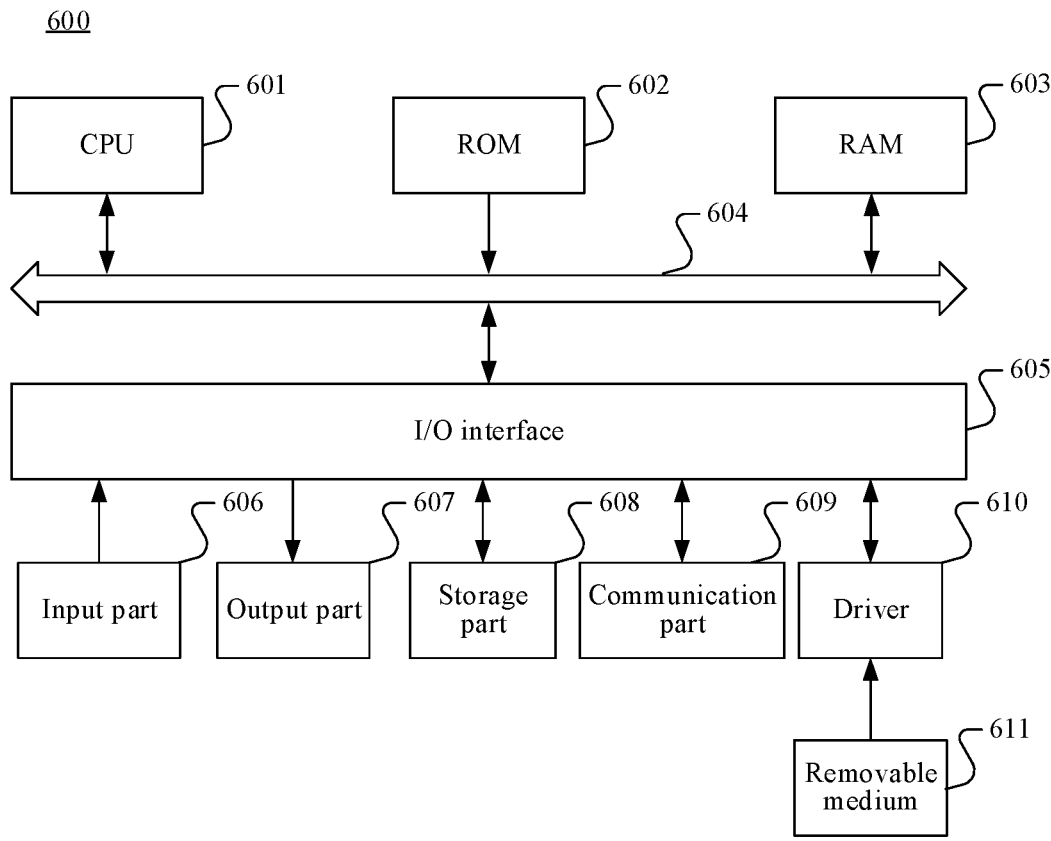
FIG. 6 is a schematic structural diagram of a computer system adapted to implement an electronic device according to an embodiment of this application.

FIG. 6 is a schematic structural diagram of a computer system adapted to implement an electronic device according to an embodiment of this application.

A computer system 600 of the electronic device shown in FIG. 6 is merely an example, and does not constitute any limitation on functions and use ranges of the embodiments of this application.

As shown in FIG. 6, the computer system 600 includes a central processing unit (CPU) 601, which may execute various appropriate actions and processing according to a program stored in a read-only memory (ROM) 602 or a program loaded from a storage part 608 to a random access memory (RAM) 603, for example, perform the method described in the foregoing embodiments. The RAM 603 further stores various programs and data required for operating the system. The CPU 601, the ROM 602, and the RAM 603 are connected to each other through a bus 604. An input/output (I/O) interface 605 is also connected to the bus 604.

The following components are connected to the I/O interface 605: an input part 606 including a keyboard, a mouse, or the like, an output part 607 including a cathode ray tube (CRT), a liquid crystal display (LCD), a speaker, or the like, a storage part 608 including a hard disk, or the like, and a communication part 609 including a network interface card such as a local area network (LAN) card or a modem. The communication part 609 performs communication processing by using a network such as the Internet. A drive 610 is also connected to the I/O interface 605 as required. A removable medium 611, such as a magnetic disk, an optical disc, a magneto-optical disk, or a semiconductor memory, is mounted on the driver 610 as required, so that a computer program read from the removable medium is installed into the storage part 608 as required.

Particularly, according to an embodiment of the present application, the processes described above by referring to the flowcharts may be implemented as computer software programs. For example, an embodiment of this application includes a computer program product. The computer program product includes a computer program stored in a computer-readable medium. The computer program includes a computer program used for performing a method shown in the flowchart. In such an embodiment, the computer program may be downloaded and installed through the communication part 609 from a network, and/or installed from the removable medium 611. When the computer program is executed by the CPU 601, the various functions defined in the system of this application are executed.

The computer-readable medium shown in the embodiments of this application may be a computer-readable signal medium or a non-transitory computer-readable storage medium or any combination thereof. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In this application, the non-transitory computer-readable storage medium may be any tangible medium containing or storing a program, and the program may be used by or used in combination with an instruction execution system, an apparatus, or a device. In this application, a computer-readable signal medium may include a data signal in a baseband or propagated as a part of a carrier wave, the data signal carrying a computer-readable computer program. A data signal propagated in such a way may assume multiple forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program comprised in the computer-readable medium may be transmitted by using any suitable medium, comprising but not limited to: a wireless medium, a wire, or the like, or any suitable combination thereof.

The flowcharts and block diagrams in the accompanying drawings illustrate possible system architectures, functions, and operations that may be implemented by a system, a method, and a computer program product according to various embodiments of this application. Each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Related units described in the embodiments of this application may be implemented in a software manner, or may be implemented in a hardware manner, and the unit described can also be set in a processor. Names of the units do not constitute a limitation on the units in a specific case.

According to another aspect, this application further provides a computer-readable medium. The computer-readable medium may be included in the electronic device described in the foregoing embodiments, or may exist alone and is not assembled in the electronic device. The computer-readable medium carries one or more programs, the one or more programs, when executed by the electronic device, causing the electronic device to implement the method described in the foregoing embodiments.

Although multiple modules or units of a device configured to perform actions are discussed in the foregoing detailed description, such division is not mandatory. Actually, according to the implementations of this application, the features and functions of two or more modules or units described above may be specifically implemented in one module or unit. Conversely, features and functions of one module or unit described above may be further divided into multiple modules or units for implementation.

Through the descriptions of the foregoing implementations, a person skilled in the art easily understands that the exemplary implementations described herein may be implemented through software, or may be implemented through software located in combination with necessary hardware. Therefore, the technical solutions of the embodiments of this application may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this application.

After considering the specification and practicing the disclosed embodiments, a person skilled in the art may easily conceive of other implementations of this application. This application is intended to cover any variations, uses or adaptive changes of this application. Such variations, uses or adaptive changes follow the general principles of this application, and include well-known knowledge and conventional technical means in the art that are not disclosed in this application.

It is to be understood that this application is not limited to the precise structures described above and shown in the accompanying drawings, and various modifications and changes can be made without departing from the scope of this application. The scope of this application is limited by the appended claims only.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs processing and/or transmitting. In practical application, the foregoing functions may be allocated to and completed by different functional modules according to requirements, that is, an inner structure of a device is divided into different functional modules to implement all or a part of the functions described above.

What is claimed is:

1. A platooning processing method, performed by an electronic device, wherein the electronic device is communicatively connected with advanced driving assistance system (ADAS) modules of multiple vehicles traveling in platooning via a roadside cloud platform, the method comprising:
    obtaining ADAS capability information of the multiple vehicles, wherein the ADAS capability information comprises communication capability information of the multiple vehicles;
    determining an effective communication range between the multiple vehicles based on the communication capability information of the multiple vehicles;
    obtaining location information and traveling status information of the multiple vehicles in platooning, and traffic condition information of a road segment on which the multiple vehicles travel;
    determining whether the multiple vehicles are suitable for continuing the platooning according to the location information and the traveling status information of the multiple vehicles, and the traffic condition information of the road segment on which the multiple vehicles travel, further including:
        determining a safety distance between the multiple vehicles according to the location information and the traveling status information of the multiple vehicles, and the traffic condition information of the road segment on which the multiple vehicles travel;
        comparing the safety distance with the effective communication range; and
    transmitting a platoon dismissing notification message to the ADAS modules of the multiple vehicles in accordance with a determination that the safety distance is greater than the effective communication range, wherein the ADAS modules of the multiple vehicles control the multiple vehicles to perform predefined operations to cancel the platooning in accordance with the platoon dismissing notification message.

2. The platooning processing method according to claim 1, wherein determining whether the multiple vehicles are suitable for continuing the platooning according to the location information and the traveling status information of the multiple vehicles, and the traffic condition information of the road segment on which the multiple vehicles travel comprises:
    determining that the multiple vehicles are not suitable for continuing the platooning when it is determined according to the location information and the traveling status information of the multiple vehicles, and the traffic condition information that the road segment on which the multiple vehicles travel has a potential safety risk.

3. The platooning processing method according to claim 2, wherein the potential safety risk includes at least one of:
    a landslide on the road segment on which the multiple vehicles travel;
    a wet road on the road segment on which the multiple vehicles travel;
    a crosswind on the road segment on which the multiple vehicles travel; and
    a tunnel on the road segment on which the multiple vehicles travel.

4. The platooning processing method according to claim 1, wherein determining whether the multiple vehicles are suitable for continuing the platooning according to the location information and the traveling status information of the multiple vehicles, and the traffic condition information of the road segment on which the multiple vehicles travel comprises:
    determining that the multiple vehicles are not suitable for continuing the platooning when it is determined according to the location information and the traveling status information of the multiple vehicles, and the traffic condition information that there is interference from other objects on the road segment on which the multiple vehicles travel.

5. The platooning processing method according to claim 4, further comprising:
    determining that there is interference from other objects on the road segment on which the multiple vehicles travel when it is determined according to the location information and the traveling status information of the multiple vehicles, and the traffic condition information indicating that some of the multiple vehicles can avoid the other objects and further indicating that other vehicles than the other of the multiple vehicles cannot avoid the other objects.

6. The platooning processing method according to claim 1, wherein determining whether the multiple vehicles are suitable for continuing the platooning according to the location information and the traveling status information of the multiple vehicles, and the traffic condition information of the road segment on which the multiple vehicles travel comprises:
    determining that the multiple vehicles are not suitable for continuing platooning when it is determined according to the location information and the traveling status information of the multiple vehicles, and the traffic condition information that a network state of the road segment on which the multiple vehicles travel is insufficient to support the platooning.

7. The platooning processing method according to claim 6, wherein it is determined that the network state of the road segment on which the multiple vehicles travel is insufficient to support the platooning when it is determined according to the location information and that traveling status information of the multiple vehicles, and the traffic condition information that the road segment on which the multiple vehicles travel is not within a network coverage range or network quality of the road segment on which the multiple vehicles travel is less than a specified value.

8. The platooning processing method according to claim 1, further comprising:
    transmitting a notification message for maintaining the platooning to the multiple vehicles when it is determined that the multiple vehicles are suitable for continuing the platooning, to inform the multiple vehicles to maintain the platooning within a specified duration.

9. The platooning processing method according to claim 8, further comprising:
    after transmitting the notification message for maintaining the platooning to the multiple vehicles, re-determining whether the multiple vehicles are suitable for continuing the platooning when a request message of whether to maintain the platooning is received from a designated vehicle of the multiple vehicles, wherein the request message is transmitted by the designated vehicle after the specified duration; and
    transmitting the notification message for maintaining the platooning to the multiple vehicles when it is re-determined that the multiple vehicles are suitable for continuing the platooning.

10. An electronic device, wherein the electronic device is communicatively connected with advanced driving assistance system (ADAS) modules of multiple vehicles traveling in platooning via a roadside cloud platform, the electronic device comprising:
    one or more processors; and
    memory storing one or more programs, the one or more programs comprising instructions that, when executed by the one or more processors, cause the one or more processors to perform operations comprising:
        obtaining ADAS capability information of the multiple vehicles, wherein the ADAS capability information comprises communication capability information of the multiple vehicles;
        determining an effective communication range between the multiple vehicles based on the communication capability information of the multiple vehicles;
        obtaining location information and traveling status information of the multiple vehicles in platooning, and traffic condition information of a road segment on which the multiple vehicles travel;
        determining whether the multiple vehicles are suitable for continuing the platooning according to the location information and the traveling status information of the multiple vehicles, and the traffic condition information of the road segment on which the multiple vehicles travel, further including:
            determining a safety distance between the multiple vehicles according to the location information and the traveling status information of the multiple vehicles, and the traffic condition information of the road segment on which the multiple vehicles travel;
            comparing the safety distance with the effective communication range; and
            transmitting a platoon dismissing notification message to the ADAS modules of the multiple vehicles in accordance with a determination that the safety distance is greater than the effective communication range, wherein the ADAS modules of the multiple vehicles control the multiple vehicles to perform predefined operations to cancel the platooning in accordance with the platoon dismissing notification message.

11. The electronic device according to claim 10, wherein determining whether the multiple vehicles are suitable for continuing the platooning according to the location information and the traveling status information of the multiple vehicles, and the traffic condition information of the road segment on which the multiple vehicles travel comprises:
    determining that the multiple vehicles are not suitable for continuing the platooning when it is determined according to the location information and the traveling status information of the multiple vehicles, and the traffic condition information that the road segment on which the multiple vehicles travel has a potential safety risk.

12. The electronic device according to claim 11, wherein the potential safety risk includes at least one of:
    a landslide on the road segment on which the multiple vehicles travel;
    a wet road on the road segment on which the multiple vehicles travel;
    a crosswind on the road segment on which the multiple vehicles travel; and
    a tunnel on the road segment on which the multiple vehicles travel.

13. The electronic device according to claim 10, wherein determining whether the multiple vehicles are suitable for continuing the platooning according to the location information and the traveling status information of the multiple vehicles, and the traffic condition information of the road segment on which the multiple vehicles travel comprises:
    determining that the multiple vehicles are not suitable for continuing the platooning when it is determined according to the location information and the traveling status information of the multiple vehicles, and the traffic condition information that there is interference from other objects on the road segment on which the multiple vehicles travel.

14. The electronic device according to claim 10, wherein determining whether the multiple vehicles are suitable for continuing the platooning according to the location information and the traveling status information of the multiple vehicles, and the traffic condition information of the road segment on which the multiple vehicles travel comprises:
    determining that the multiple vehicles are not suitable for continuing platooning when it is determined according to the location information and the traveling status information of the multiple vehicles, and the traffic condition information that a network state of the road segment on which the multiple vehicles travel is insufficient to support the platooning.

15. The electronic device according to claim 10, wherein the operations further comprise:
    transmitting a notification message for maintaining the platooning to the multiple vehicles when it is determined that the multiple vehicles are suitable for continuing the platooning, to inform the multiple vehicles to maintain the platooning within a specified duration.

16. A non-transitory computer-readable storage medium, storing one or more instructions, the one or more instructions, when executed by one or more processors of an electronic device, wherein the electronic device is communicatively connected with advanced driving assistance system (ADAS) modules of multiple vehicles traveling in platooning via a roadside cloud platform, cause the electronic device to perform operations comprising:

obtaining ADAS capability information of the multiple vehicles, wherein the ADAS capability information comprises communication capability information of the multiple vehicles;

determining an effective communication range between the multiple vehicles based on the communication capability information of the multiple vehicles;

obtaining location information and traveling status information of the multiple vehicles in platooning, and traffic condition information of a road segment on which the multiple vehicles travel;

determining whether the multiple vehicles are suitable for continuing the platooning according to the location information and the traveling status information of the multiple vehicles, and the traffic condition information of the road segment on which the multiple vehicles travel, further including:

determining a safety distance between the multiple vehicles according to the location information and the traveling status information of the multiple vehicles, and the traffic condition information of the road segment on which the multiple vehicles travel;

comparing the safety distance with the effective communication range; and transmitting a platoon dismissing notification message to the ADAS modules of the multiple vehicles in accordance with a determination that the safety distance is greater than the effective communication range, wherein the ADAS modules of the multiple vehicles control the multiple vehicles to perform predefined operations to cancel the platooning in accordance with the platoon dismissing notification message.

17. The non-transitory computer-readable storage medium according to claim 16, wherein determining whether the multiple vehicles are suitable for continuing the platooning according to the location information and the traveling status information of the multiple vehicles, and the traffic condition information of the road segment on which the multiple vehicles travel comprises:

determining that the multiple vehicles are not suitable for continuing the platooning when it is determined according to the location information and the traveling status information of the multiple vehicles, and the traffic condition information that there is interference from other objects on the road segment on which the multiple vehicles travel.

18. The non-transitory computer-readable storage medium according to claim 16, wherein determining whether the multiple vehicles are suitable for continuing the platooning according to the location information and the traveling status information of the multiple vehicles, and the traffic condition information of the road segment on which the multiple vehicles travel comprises:

determining that the multiple vehicles are not suitable for continuing platooning when it is determined according to the location information and the traveling status information of the multiple vehicles, and the traffic condition information that a network state of the road segment on which the multiple vehicles travel is insufficient to support the platooning.

19. The non-transitory computer-readable storage medium according to claim 16, wherein determining whether the multiple vehicles are suitable for continuing the platooning according to the location information and the traveling status information of the multiple vehicles, and the traffic condition information of the road segment on which the multiple vehicles travel comprises:

determining that the multiple vehicles are not suitable for continuing the platooning when it is determined according to the location information and the traveling status information of the multiple vehicles, and the traffic condition information that the road segment on which the multiple vehicles travel has a potential safety risk.

20. The non-transitory computer-readable storage medium according to claim 16, wherein the operations further comprise:

transmitting a notification message for maintaining the platooning to the multiple vehicles when it is determined that the multiple vehicles are suitable for continuing the platooning, to inform the multiple vehicles to maintain the platooning within a specified duration.

* * * * *